United States Patent [19]
Iga et al.

[11] Patent Number: 5,948,133
[45] Date of Patent: *Sep. 7, 1999

[54] METHOD FOR HOLDING AN EDGE OF A MOLTEN GLASS FLOW

[75] Inventors: Motoichi Iga, Yokohama; Toru Kamihori, Yokohama; Ryosuke Akagi, Funabashi; Atsushi Inoue, Yokohama, all of Japan

[73] Assignee: Asahi Glass Company Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,656

[22] Filed: Feb. 26, 1997

[30] Foreign Application Priority Data

Feb. 29, 1996 [JP] Japan ................................. 8-043488
Dec. 25, 1996 [JP] Japan ................................. 8-346287

[51] Int. Cl.⁶ .......................... C03B 18/02; C03B 18/04
[52] U.S. Cl. ............................ 65/99.2; 65/99.5; 65/99.6; 65/182.4
[58] Field of Search ........................ 65/99.5, 99.6, 65/99.1, 99.2, 182.4

[56] References Cited

U.S. PATENT DOCUMENTS

| | | | |
|---|---|---|---|
| 3,317,302 | 5/1967 | Misson | 65/99.6 |
| 3,459,523 | 8/1969 | Atkeson | 65/99.6 |
| 3,496,736 | 2/1970 | Hurwitz et al. | 65/99.6 |
| 3,718,450 | 2/1973 | Ohsato et al. | 65/99.6 |
| 4,012,216 | 3/1977 | Marchand | 65/99.6 |
| 4,081,260 | 3/1978 | Glikman et al. | 65/99.2 |
| 4,784,680 | 11/1988 | Sato et al. | 65/99.6 |
| 4,940,479 | 7/1990 | Sato et al. | 65/99.5 |

FOREIGN PATENT DOCUMENTS

| | | |
|---|---|---|
| 0 251 325 | 1/1988 | European Pat. Off. . |
| 0 304 844 | 3/1989 | European Pat. Off. . |

*Primary Examiner*—Steven P. Griffin
*Attorney, Agent, or Firm*—Oblon, Spivak, McClelland, Maier & Neustadt, P.C.

[57] ABSTRACT

A method for holding an edge of a molten glass flow, comprising forming a molten glass flow by continuously feeding molten glass on a bath surface of molten metal contained in a vessel, holding an edge of the molten glass flow in a width direction thereof when advancing the molten glass flow to draw the molten glass flow in a glass ribbon having a target thickness, and controlling a flow of the molten metal so that a bath surface level in height of the molten metal in the vicinity of the edge of the molten glass flow is different from that of the molten metal in the vicinity of a central portion of the molten glass flow in the width direction thereof, whereby a force to spread or narrow the molten glass flow in the width direction is compensated so as to hold the edge of the molten glass flow at a predetermined position.

8 Claims, 3 Drawing Sheets

METHOD FOR HOLDING AN EDGE OF A MOLTEN GLASS FLOW

FIELD OF THE INVENTION

The present invention relates to a method and an apparatus for preparing plate glass by a float glass process, in particular a method for holding an edge of a molten glass flow supplied on a molten metal bath surface and a glass ribbon drawing apparatus.

DISCUSSION OF THE BACKGROUND

In general, preparation of plate glass by a float glass process has been carried out as follows: Molten glass is continuously flowed into a bath with molten metal (typically molten tin) filled therein. The molten glass is adjusted to have a certain width, flowing in an advancing direction. For example, when a float glass process is used to prepare plate glass having a thickness not more than a so-called equilibrium thickness, molten glass is supplied on a molten metal bath, and then the molten glass flow is stretched on the bath by applying a pulling force to the molten glass in the advancing direction thereof. Since the molten glass flow attenuates in a width direction thereof when the molten glass flow is stretched, the molten glass flow has opposite edges engaged with top rollers to restrict the attenuation.

However, the molten glass flow is required to have a certain extent of viscosity for effective engagement with the top rolls. In case of e.g. soda lime silicate glass, the molten glass flow is required to have a temperature of about 750°–about 950° C. and a viscosity of about $10^4$ poise–$10^7$ poise at the time of engagement with the top rollers. Such a viscosity creates a problem in that a glass surface is likely to be subjected to minute wave, i.e. distortion by engagement with the top rolls.

When the molten glass flow has the opposite side edges held by engagement with the top rolls, the molten glass flow is cooled by the top rolls at portions thereof where the top rolls are engaged. As a result, the viscosity of the molten glass lowers at such portions in comparison with a central portion of the molten glass to prevent plate glass from having a target thickness. These portions can not be used for commercial products, which causes a decrease in production yield.

SUMMARY OF THE INVENTION

It is an object of the present invention to eliminate the problems of the prior art as stated earlier, and to provide a method for preparing float plate glass capable of carrying out stable production with occurrence of distortion minimized and with good production yield, offering effective operating performance without top rollers, and shortening the length in a flowing direction required for drawing the plate glass.

The present invention provides a method for holding an edge of molten glass flow, comprising forming a molten glass flow by continuously feeding molten glass on a bath surface of molten metal contained in a vessel, holding an edge of the molten glass flow in a width direction thereof when advancing the molten glass flow to draw the molten glass flow in a glass ribbon having a target thickness, and controlling a flow of the molten metal so that a bath surface level in height of the molten metal in the vicinity of the edge of the molten glass flow is different from that of the molten metal in the vicinity of a central portion of the molten glass flow in the width direction thereof, whereby a force to spread or narrow the molten glass flow in the width direction is compensated so as to hold the edge of the molten glass flow at a predetermined position. The present invention also provides a glass ribbon drawing apparatus comprising a float forming vessel for advancing a molten glass flow on molten metal contained therein to draw the molten glass flow in a glass ribbon having a target thickness, and spouting and sucking means for selectively spouting and sucking the molten metal along a desired edge of the molten glass flow in a vertical direction.

In a mode of the present invention, the flow of the molten metal is created in the vicinity of opposite edges of the molten glass flow in a bath of the molten metal in a vertical direction toward or away from the bath surface thereof to control the bath surface level of the molten metal in the vicinity of the edges of the molten glass flow.

In another mode of the present invention, a passage for the molten metal is formed so as to extend downwardly from a position in the vicinity of the edges of the molten glass flow, and a flowing direction and a flowing amount of the molten metal passing through the passage are adjusted to control the bath level of the molten metal.

In order to adjust and form molten glass so as to have a target thickness, a temperature region is about 750° C.–about 1,100° C., i.e. a viscosity region is about $10^{3.5}$ poise–about $10^7$ poise with respect to soda lime silicate glass. In a high temperature area, the surface tension of the molten glass dominates determination of the thickness of plate glass. This means that lateral force applied to opposite side edges of the molten glass by the surface tension thereof must be compensated in order to overcome the surface tension to form the molten glass flow so as to have the target thickness.

The present invention is characterized in that the force to spread or narrow the molten glass flow in the width direction which is created by forming the molten glass flow is compensated by making the surface level of the molten metal in the vicinity of the edges of the molten glass flow higher or lower than that of the molten metal in the vicinity of the central portion of the molten glass flow, not by engagement with top rolls, thereby to hold the edges of the molten glass flow at a predetermined position.

For example, when the force to narrow the molten glass flow in the width direction is dominant over the force to spread the molten glass flow on preparation of the glass ribbon having the target thickness, the bath level of the molten metal in the vicinity of the edges of the molten glass flow is controlled to be lower than the bath level of the molten metal in the vicinity of the central portion of the molten glass flow. And thereby the thickness of the edges of the molten glass flow can be greater than that of the molten glass flow in the vicinity of the central portion thereof. As a result, the lateral force which acts as the surface tension to the edges of the molten glass flow (i.e. the force to narrow the molten glass flow in the width direction) can be compensated to hold the edges of the molten glass flow at the predetermined position. The force to narrow the molten glass flow in the width direction is normally dominant when a glass ribbon is prepared to have a thickness less than the equilibrium thickness.

The equilibrium thickness means the thickness which is determined by the surface tension and the density of molten glass and molten metal, and the thickness of a glass ribbon which is determined when molten glass is gently put on molten metal at a temperature not lower than 1,050° C. (corresponding to a viscosity not lower than $10^4$ poise) in case of soda lime silicate glass.

On the other hand, when the force to spread the molten glass flow in the width direction is dominant over the force to narrow the molten glass flow on preparation of the glass ribbon having the target thickness, the bath level of the molten metal in the vicinity of the edges of the molten glass flow is controlled to be higher than the bath level of the molten metal in the vicinity of the central portion of the molten glass flow. As a result, the thickness of the edges of the molten glass flow can be made thinner than the thickness of the molten glass flow in the vicinity of the central portion thereof to compensate the force to spread the molten glass flow in the width direction. The force to spread the molten glass flow in the width direction is normally dominant when a glass ribbon is prepared to have a thickness more than the equilibrium thickness.

DESCRIPTION OF THE PREFERRED EMBODIMENTS

Now, the present invention will be described in detail with reference to preferred embodiments illustrated in the accompanying drawings.

In accordance with the present invention, a molten glass flow is led to a forming area which is provided on a bath surface of molten metal contained in a vessel in which the edge holding method according to the present invention is applied. In order to lead the molten glass flow to a forming area, various kinds of known methods can be adopted. For example, the molten glass flow may be drawn out from a molten glass tank by a rolling out process or a down draw process to form the molten glass having a certain width and a certain thickness on the molten metal in a ribbon form. Restrictor tiles as disclosed in U.S. Pat. No. 4,784,680 may be used to widen molten glass in a ribbon form on a bath surface of the molten metal so as to obtain the molten glass flow.

Since the molten glass flow which has been led on the molten metal is apt to have a thickness approached an equilibrium thickness depending on its own surface tension as explained earlier, measures for holding side edges of the molten glass flow is required to produce a glass ribbon having a desired thickness. One of specific modes of the measures is shown in FIGS. 1–3.

Figure 1:
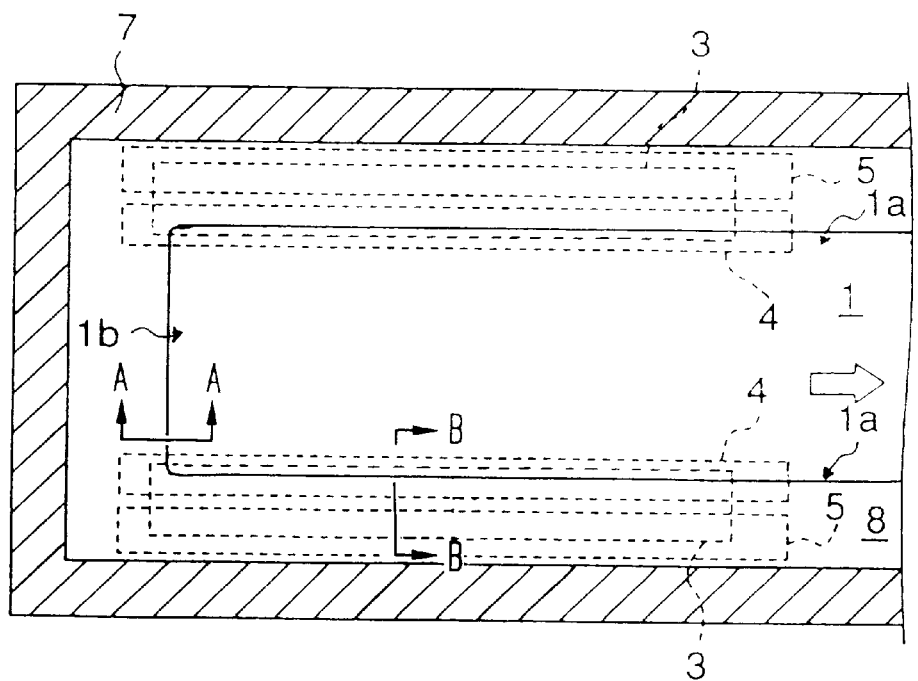
FIG. 1 is a plan view explaining the method according to an embodiment of the present invention.

In FIG. 1, there is shown a plan view of a vessel into which molten glass flow is led after the molten glass flow has been adjusted to have a predetermined thickness and a predetermined width outside the molten metal bath vessel by e.g. a flow out process. The vessel 7 has molten metal (typically molten tin) 2 charged therein.

Figure 2:
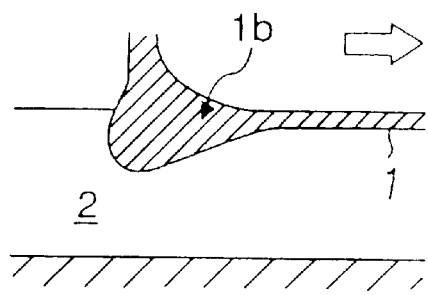
FIG. 2 is a cross-sectional view of the essential portions of the embodiment taken along the line A—A of FIG. 1.
Figure 3:
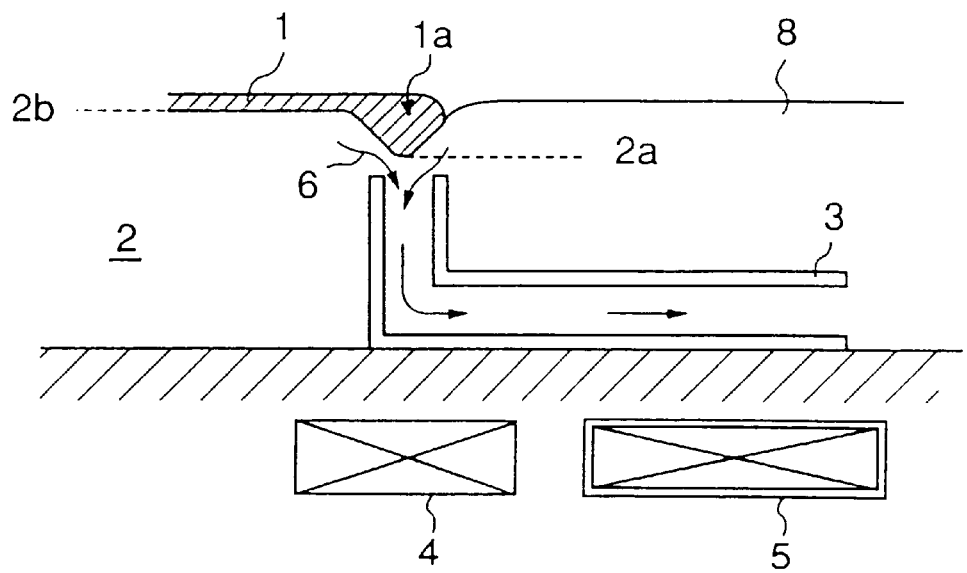
FIG. 3 is a cross-sectional view of the essential portions of the embodiment taken along the line B—B of FIG. 1.

In FIG. 2, there is shown a cross-sectional view taken along the line A—A of FIG. 1. A molten glass flow 1 falls onto the molten metal 2 at a falling portion 1b and advances in a direction indicated by an arrow as shown in FIG. 2.

As shown in FIG. 1, troughs (conduits) 3 which work as passages for the molten metal 2 in the vicinity of side edges 1a of the molten glass flow are provided under the side edges of the molten glass flow. In FIG. 3, there is shown a cross-sectional view taken along the line B—B of FIG. 1, which depicts one of the troughs 3 and its surroundings in an enlarged scale. The troughs 3 have one end opened to face the side edges 1a just therebelow. Each side edge 1a of the molten glass flow extends substantially vertically to the accompanying drawing, and the opened end of each trough extends substantially vertically to the accompanying drawing along the corresponding side edge 1a. Each trough 3 extends downwardly from a position substantially just below the corresponding side edge 1a of the molten glass flow, bends substantially rectangularly on the bottom of the vessel 7 toward a side wall of the vessel, and has the other end opened at a position in the vicinity of the side wall of the vessel 7.

Linear motors 5 are provided at positions near to the side walls of the vessel 7 and outside the vessel 7 just below the troughs 3. The linear motors 5 excite the molten metal 2 so that the molten metal 2 in the troughs 3 flows from portions below the side edges 1a toward the side walls of the vessel 7 or in the opposite direction. The molten metal 2 in the troughs 3 is excited to flow in the horizontal direction at positions near to the side walls of the vessel 7. On the other hand, the molten metal in the troughs 3 is excited to flow vertically at the opened ends facing the side edges 1a of the molten glass flow because the troughs 3 are bent. In FIG. 3, there is shown a case wherein the molten metal 2 flows downwardly in the vicinity of the opened end of the troughs 3 facing the corresponding side edge 1a of the molten glass flow.

The linear motors generate a magnetic field to shift in a certain direction by winding coils on a primary slotted iron core, and applying a three phase alternating current to magnetize the coils one after another as has come in practice in linear induction motors, electromagnetic pumps and so on.

When a flow of the molten metal is controlled by use of the linear motors, the troughs must be made of a non-magnetic material to effectively exert the magnetic field by the linear motor to the molten metal in the troughs. Generally speaking, it is preferable that the troughs are made of a material having low reactivity with the molten metal. For the reasons, e.g. carbon and brick are suitable as the material of the troughs.

In addition, static magnetic field generating devices 4 are arranged in the vicinity of positions just below the side edges 1a to apply a static magnetic field to the molten metal 2 in the vicinity of these positions so as to stabilize the flow of the molten metal.

A method for holding the side edges according to the present invention will be explained in detail. The explanation will be made with respect to a case wherein plate glass is prepared to have a thickness less than the equilibrium thickness (the force to narrow the molten glass flow in the width direction is dominant).

The molten glass flow which has fallen on the molten metal 2 advances to be supplied at the edge holding portions. As the linear motors 5 are activated, flows 6 of the molten metal 2 are created in the troughs 3 to be directed from portions in the vicinity of the side edges of the molten glass flow 1 toward ribbon side portions (portions of the molten metal not covered by the molten glass flow) 8 as shown in FIG. 3.

As a result, a downward flow of molten metal is induced at each edge holding portion to produce a negative pressure, lowering a bath surface level $2a$ in height of the molten metal at the edge holding portion in comparison with a bath surface level $2b$ in height of the molten metal around the edge holding portion. The molten glass flows into a lowered position to make the thickness of the corresponding edge $1a$ thicker than that of a central portion of the molten glass. In this manner, an attenuation force which is caused by the surface tension of the glass is compensated to hold each edge at a predetermined position as stated earlier.

Although there is no limitation with respect to the level difference of the bath surfaces of the molten metal, the level difference may be about 1 mm–about 30 mm. For preparing of plate glass having thickness less than the equilibrium thickness, the level difference may be normally in a range of 5–6 mm to achieve the goal in a sufficient manner. For preparation of plate glass having a much thinner thickness, the level difference is varied depending on the required thickness so as to enlarge the level difference.

For example, application of an alternating current magnetic field at 50 Hz and 75 gauss can produce a level difference of about 4 mm. Since an electromagnetic force is proportional to the square of the strength of a magnetic field, the generated level difference is proportional to the square of the strength of the magnetic field. The level difference can be easily modified by changing the strength of the electromagnetic force.

In the present invention, it is preferable that the static magnetic field generating devices are also activated to apply a static magnetic field to positions in the vicinity of the edge holding portions for the molten glass flow 1. Thus, disturbance of the flow of the molten metal 2 in these positions can be minimized to stabilize the shape of the molten metal bath surface, thereby holding the edges in a more stable manner. The magnitude of the magnetic field is preferably 0–1,000 gauss, in particular not less than 500 gauss.

It is enough that the edge holding according to the present invention is carried out in a range wherein the molten glass flow has a viscosity of $10^2$–$10^7$ poise. The formed molten glass flow is cooled to have a viscosity of about $10^{11}$ poise, is drawn out of the vessel with the thickness being steady, and is transferred onto an annealing lehr.

Figure 4:
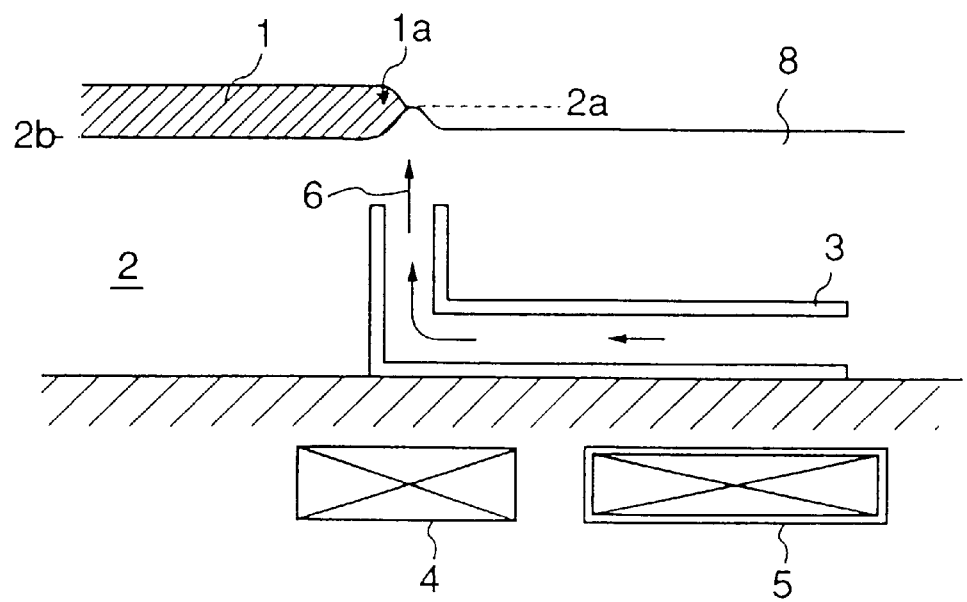
FIG. 4 is a cross-sectional view of the essential portions of another embodiment taken along the line B—B of FIG. 1.

For preparation of plate glass having a thickness greater than the equilibrium thickness (when the force to spread the molten glass flow in the width direction is dominant), the direction of the magnetic field by the linear motors 5 is reversed to induce flows of the molten metal 2 from the respective ribbon side portions 8 toward the edge holding portions in the respective troughs 3. This state is shown in FIG. 4.

In this case, the flows of the molten metal are upwardly generated at the edge holding portions to work as a positive pressure, raising the bath surface level $2a$ in height of the molten metal at the edge holding portions in comparison with the bath surface level $2b$ around the edge holding portions. Thus, the force to spread the molten glass flow in the width direction is compensated to hold the edges at a predetermined position.

It is preferable that the static magnetic field generating devices are simultaneously activated to apply the static magnetic fields in the vicinity of the edge holding portions of the molten glass flow 1 as in the preparation of plate glass having a thickness less than the equilibrium thickness.

Figure 5:
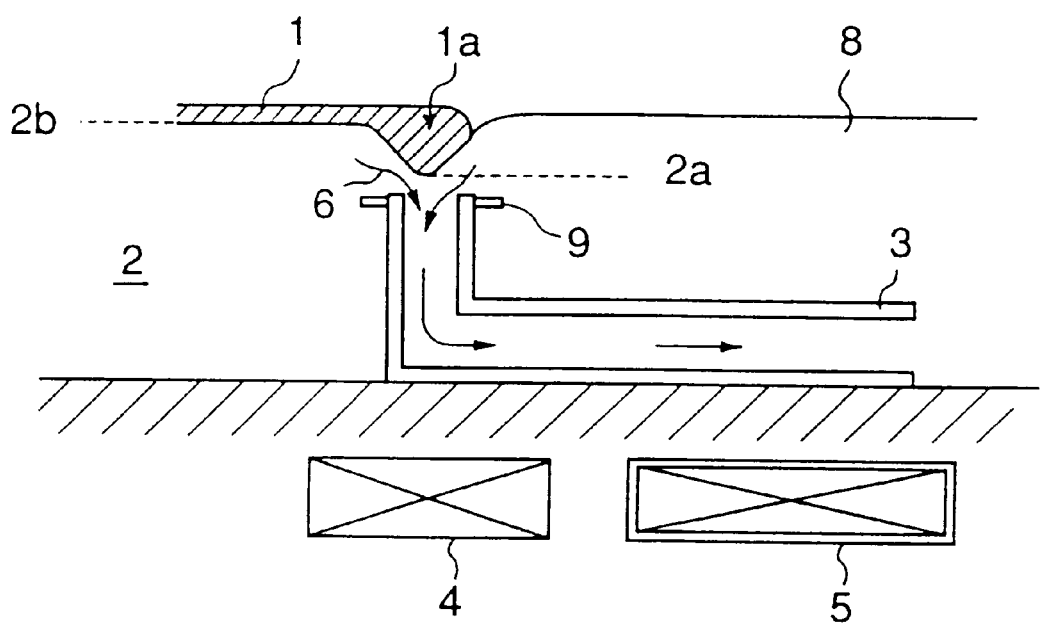
FIG. 5 is a cross-sectional view showing another embodiment of the present invention.

When the molten metal level at the edge portions is set at a peculiarly low position in accordance with the method shown in FIG. 1, the molten glass can stick to the troughs because the distance between the molten glass flow 1 and the troughs 3 is short (e.g. 1–2 mm). In addition, there is a need to amplify the driving force by the linear motors to increase the flowing amount of the molten metal. In FIG. 5, there is shown an arrangement which is effective in that case. Reference numeral 9 designates one of wings which are formed on the troughs 3.

In the embodiment shown in FIG. 5, the troughs 3 have the open ends facing the edge portions provided at a periphery with the wings 9 so as to project outwardly. By the provision of the wings 9, the molten metal is subjected to pressure loss due to sudden reduction of the passages and to friction loss on the upper surface of the wings, allowing the level difference to be formed more effectively.

Although the wings 9 may be provided in substantial parallel with the bath surface of the molten metal 2 like the embodiment, the wings may be arranged to be inclined. For example, the wings can be outwardly and upwardly inclined at 0–60 deg to horizontal.

In the embodiment, the molten metal can have a flow velocity of 0.1–1.0 m/s on the wings to generate about 4 mm–about 8 mm of level difference of the molten metal surface when the level of the molten metal from the bottom of the vessel is 70 mm, the height of the troughs is 60 mm, the width of the inlet of the troughs is 15 mm, the width of the outlet of the troughs is 25 mm and the projecting length of the wings is 10–30 mm, and when the alternating current magnetic field as the measures to flow the molten metal is applied at 50 Hz and 150 gauss by the linear motors. In addition, the distance between the molten glass flow and the wings or trough constituent members can be ensured to be about 5 mm or more, having no risk that the molten glass sticks to the troughs.

In accordance with the embodiment, the shape, the length and the projecting angle of the wings can be adequately modified to change the bath surface level in an appropriate manner. When the wings have a projection length of about 5 mm or more, the wings can offer sufficient result.

For preparation of plate glass having a thickness less than the equilibrium thickness, the present invention can provide a method for preparing float glass capable of carrying out stable production without distortion in the glass, offering effective operating performance without top rollers, and shortening the length in the flowing direction required to draw the glass.

For preparation of plate glass having a thickness not less than the equilibrium thickness, the present invention can provide a method for preparing float glass capable of minimizing the occurrence of distortion and offering effective operating performance.

In addition, the present invention can also offer an advantage in that the production yield of the glass can be improved because the edge areas of the molten glass flow to be held are narrower than the conventional method.

What is claimed is:

1. A method for holding an edge of a molten glass flow, comprising:

forming a molten glass flow by continuously feeding molten glass on a bath surface of molten metal contained in a vessel; and holding an edge of the molten glass flow at a predetermined position in a width direction thereof when advancing the molten glass flow to draw the molten glass flow in a glass ribbon having a target thickness, wherein the holding step comprises continuously flowing a flow of the molten metal so that a bath surface level in height of the molten metal in the vicinity of the edge of the molten glass flow is different from that of the molten metal in the vicinity of a central portion of the molten glass flow in a width direction thereof, whereby a force to spread or narrow the molten glass flow in the width direction thereof is compensated, and wherein the flow of the molten metal is generated in the vicinity of the edge of the molten glass flow in a bath of the molten metal so as to have a component directed in a direction vertical to the bath surface thereof to control the bath surface level of the molten metal in the vicinity of the edge of the molten glass flow, and wherein when the flow of the molten metal is directed away from the bath surface the flow of the molten metal causes the bath surface level of the molten metal in the vicinity of the edge of the molten glass flow to be lower than the bath surface level of the molten metal in the vicinity of the central portion of the molten glass flow so as to form the glass ribbon having the target thickness which is thinner than an equilibrium thickness of the glass ribbon, and wherein when the flow of the molten metal is directed towards the bath surface the flow of the molten metal causes the bath surface level of the molten metal in the vicinity of the edge of the molten glass flow to be higher than the bath surface level of the molten metal in the vicinity of the central portion of the molten glass flow so as to form the glass ribbon having the target thickness which is thicker than the equilibrium thickness of the glass ribbon.

2. A method according to claim 1, wherein a passage for the molten metal is formed so as to extend downwardly from a position in the vicinity of the edge of the molten glass flow, and a flowing direction and a flowing amount of the molten metal passing through the passage are adjusted to control the bath surface level of the molten metal in the vicinity of the edge of the molten glass flow.

3. A method according to claim 2, wherein the molten metal in the passage is affected by a linear motor to adjust the flowing direction and the flowing amount of the molten metal passing through the passage.

4. A method according to claim 1, wherein a difference between the bath surface level of the molten metal in the vicinity of the edge of the molten glass flow and the bath surface level of the molten metal in the vicinity of the central portion of the molten glass flow is 1–30 mm.

5. A method according to claim 1, wherein the bath surface level of the molten metal in the vicinity of the edge of the molten glass flow is controlled to be lower than the bath surface level of the molten metal in the vicinity of the central portion of the molten glass flow when the force to narrow the molten glass flow is dominant over the force to spread the molten glass flow on preparation of the glass ribbon having the target thickness.

6. A method according to claim 1, wherein the bath surface level of the molten metal in the vicinity of the edge of the molten glass flow is controlled to be higher than the bath surface level of the molten metal in the vicinity of the central portion of the molten glass flow when the force to spread the molten glass flow is dominant over the force to narrow the molten glass flow on preparation of the glass ribbon having the target thickness.

7. A method according to claim 1, wherein the edge of the molten glass flow is stabilized by a static magnetic field applied in the vicinity of the edge of the molten glass flow.

8. A method according to claim 7, wherein the static magnetic field applied in the vicinity of the edge of the molten glass flow has a magnitude of not less than 500 gauss.

* * * * *